(12) United States Patent
Deshpande (10) Patent No.: US 7,428,595 B2
(45) Date of Patent: Sep. 23, 2008

(54) SYSTEM AND METHOD FOR STREAMING TCP MESSAGES IN AN ENTERPRISE NETWORK

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1224 days.

(21) Appl. No.: 10/261,450

(22) Filed: Sep. 30, 2002

(65) Prior Publication Data

US 2004/0062201 A1 Apr. 1, 2004

(51) Int. Cl.
G06F 15/16 (2006.01)

(52) U.S. Cl. ........................................ 709/235; 709/231

(58) Field of Classification Search ................ 370/235, 370/245, 395; 709/228, 231–233, 235
See application file for complete search history.

(56) References Cited

U.S. PATENT DOCUMENTS

| 5,675,576 | A | 10/1997 | Kalampoukas et al. | 370/232 |
|---|---|---|---|---|
| 6,018,530 | A | 1/2000 | Chakravorty | 370/471 |
| 6,076,114 | A | 6/2000 | Wesley | 709/235 |
| 6,097,697 | A * | 8/2000 | Yao et al. | 370/230 |
| 6,215,769 | B1 | 4/2001 | Ghani et al. | |
| 6,252,851 | B1 * | 6/2001 | Siu et al. | 370/236 |
| 6,266,701 | B1 | 7/2001 | Sridhar et al. | 709/232 |
| 6,370,114 | B1 * | 4/2002 | Gullicksen et al. | 370/229 |
| 6,404,756 | B1 * | 6/2002 | Whitehill et al. | 370/338 |
| 6,741,555 | B1 * | 5/2004 | Li et al. | 370/229 |
| 6,842,424 | B1 * | 1/2005 | Key et al. | 370/236 |
| 6,876,639 | B1 * | 4/2005 | Cao | 370/331 |
| 7,039,702 | B1 * | 5/2006 | Churchyard | 709/224 |
| 7,039,717 | B2 * | 5/2006 | Johnson | 709/237 |
| 7,080,404 | B2 * | 7/2006 | Abdo et al. | 726/3 |
| 7,218,610 | B2 * | 5/2007 | Sivakumar et al. | 370/230 |

(Continued)

FOREIGN PATENT DOCUMENTS

JP 8163139 6/1996

(Continued)

OTHER PUBLICATIONS

Balakrishnan, Hari et al., "How Network Asymmetry Affects TCP", IEEE Communication Magazine, pp. 2-9, ,April 2001.*

(Continued)

*Primary Examiner*—Jason Cardone
*Assistant Examiner*—Thomas Duong
(74) *Attorney, Agent, or Firm*—Law Office of Gerald Maliszewski; Gerald Maliszewski (57) ABSTRACT

A system and method are provided for sending transmission control protocol (TCP) messages in a local area network (LAN). The method comprises: selecting a TCP streaming application; transmitting message segments at a rate responsive to a congestion window parameter; and, maintaining at least the congestion window parameter during the session, regardless of idle time between transmitted segments. In some aspects, the method further comprises: selecting a threshold level. Then, incrementing the congestion window parameter with an increment in response to receiving acknowledgements includes increasing the congestion window parameter until the congestion window parameter equals the threshold level. Additionally, the method further comprises: in response to not receiving an acknowledgment, maintaining the threshold level; and, in response to not receiving an acknowledgement, maintaining the congestion window parameter.

39 Claims, 4 Drawing Sheets

U.S. PATENT DOCUMENTS

| | | | |
|---|---|---|---|
| 7,304,951 B2 * | 12/2007 | Rhee | 370/235 |
| 2001/0032269 A1 | 10/2001 | Wilson | 709/235 |
| 2002/0056007 A1 * | 5/2002 | Gersht et al. | 709/235 |
| 2002/0078164 A1 | 6/2002 | Reinschmidt | 709/217 |
| 2002/0080721 A1 * | 6/2002 | Tobagi et al. | 370/236 |
| 2004/0192312 A1 * | 9/2004 | Li et al. | 455/445 |

FOREIGN PATENT DOCUMENTS

| | | |
|---|---|---|
| JP | 9205461 | 8/1997 |
| JP | 2001156795 | 6/2001 |
| WO | WO9922477 | 5/1999 |
| WO | WO015098 | 1/2001 |

OTHER PUBLICATIONS

V. Jacobson, "Congestion avoidance and control", Computer communication Review, 18(4), pp. 314-329, Aug. 1988.

W. Stevens, Internet RFC2001, TCP Slow Start, Congestion Avoidance, Fast Retransmit, and Fast Recovery Algorithms, Jan. 1997.

J. Mo, R.J. Anantharam, and J. Walrand, "Analysis and Comparison of TCP Reno and Vegas", In Proceedings of INFOCOM'99, Mar. 1999.

* cited by examiner

SYSTEM AND METHOD FOR STREAMING TCP MESSAGES IN AN ENTERPRISE NETWORK

BACKGROUND OF THE INVENTION

1. Field of the Invention

This invention generally relates to transmission control protocol (TCP) communications and, more particularly, to a system and method for real-time streaming of media from selected applications, using TCP within a local area network (LAN) or Enterprise network.

2. Description of the Related Art

As noted in U.S. Pat. No. 6,252,851 (Siu et al.), TCP is a connection-oriented transport protocol that is designed to work with any underlying network technology. TCP makes no assumption as to how the network processes the data it sends, and perform its own data recovery and flow control. The TCP acknowledgment-based flow control mechanism is designed to slow down the source rate when the network becomes congested. TCP has no direct way of knowing when the network is congested. It can only indirectly detect congestion by keeping track of how many packets are lost and/or delayed. Packet loss is indicated by a failure to receive the appropriate acknowledgments, depending on the particular TCP variant. When packets do get lost and/or delayed, the loss indicates that some queue in the network might have experienced overflow. When TCP detects a packet loss and/or delay, it reduces its source rate to alleviate the congestion that could have caused the packet loss.

TCP's congestion control and error recovery, based on acknowledgments, are implemented by a dynamic window at the source. Every packet that is sent must be acknowledged by the destination. A congestion window size determines the number of unacknowledged packets that can be present in the network at any given time, and is initially set to one. Each packet includes a sequence number, so that packets arriving at the destination out of order can be reordered. A destination responds to an incoming packet by sending an acknowledgment back to the source. If a sequence number is skipped, the destination continues to return the same sequence number, resulting in duplicate acknowledgments.

In general, when a packet is acknowledged, the congestion window size increases, and when a packet is lost, the window size decreases, forcing the rate to decrease. Specifically, during the "slow-start" phase, the window is incremented by one for each acknowledgment received, so that during this phase, two packets are transmitted for each acknowledgment received, resulting in an additive increase in the packet transmission rate.

After the window reaches some threshold, the "congestion-avoidance" phase is entered, in which the window is incremented by one for every w acknowledgments received, where w is the window size. Thus, in this phase, usually one packet is transmitted for each acknowledgment received, but occasionally (when w is incremented), two packets will be transmitted. Finally, when a maximum limit, or threshold level is reached, the window size does not change, and one packet is released for every acknowledgment received. This is the "saturation" phase. When a packet is lost, the congestion-avoidance threshold is set to one half the window size, and the window is reduced to one.

As noted in U.S. Pat. No. 6,215,769 (Ghani et al.), to manage congestion, TCP uses a sliding window mechanism coupled with reactive congestion control to adjust the sender's window size. The protocol adjusts its transmission behavior contingent to returning acknowledgment (ACK) packets sent from the remote receiver's end. A problem with TCP, however, is that its congestion control mechanism is relatively slow. Most TCP implementations use very coarse timers to measure timeouts, i.e., roughly 200-500 ms granularity. Further, most TCP implementations rely on ACK delays or packet drops to detect congestion. As a result, excessive source window reductions can result in large amounts of bandwidth being wasted as the TCP source is forced to restart its transmission window. Further, many studies have shown that TCP does not perform very well over networks with large propagation delays.

To combat the above shortcomings with TCP, it is necessary to minimize the chances of network congestion by somehow incorporating faster congestion indication mechanisms in the TCP feedback loop. However, to ensure compatibility with current versions and to expedite market acceptance, any such attempt must preclude changes to the actual TCP protocol or its implementation. Along these lines, a variety of ACK pacing schemes have been proposed. These ACK pacing schemes basically modulate the spacing of TCP ACK packets to limit source emissions during periods of congestion. ACK pacing is well-suited at the boundary of high speed (sub) networks, such as ATM, gigabit IP (i.e., optical WDM), or satellite. In essence this technique performs TCP traffic shaping at the access nodes. Such methodologies are specifically beneficial for advanced ATM data services, i.e., underlying ABR flow control or per-connection queuing, where congestion tends to buildup at the periphery of the ATM network, i.e., in the access nodes. If the forward link is congested, as indicated via some congestion metric, ACK packets are appropriately delayed before being sent to the source.

Other authors have proposed modifying fields in the ACK packets themselves, i.e., receiver-window size, to improve performance. However, such schemes either require accurate round-trip delay measurements or cannot maintain tight buffer control. Furthermore, rewriting ACK packet fields requires expensive checksum recomputations. Although ACK pacing is an effective way of controlling TCP source behaviors, many of the proposed schemes are either too complex and/or overly sensitive to network parameter settings. Since studies have shown that TCP's throughput and fairness levels can be low in many high-speed network scenarios, it is necessary to devise efficient, practical schemes to enhance its performance. Although amending the protocol's functionality itself is also an option, this may not be a feasible alternative in the short-to-medium time frame. It is along these lines that the ACK pacing methods can provide significant benefits.

TCP is not conventionally suitable for streaming media applications. This is because it TCP cannot handle time-based media in a very effective manner. However, there are applications where TCP is required for streaming media delivery. For example, a remote desktop protocol (RDP) application running on top of TCP/IP. If a RDP protocol and RDP virtual channel are being used for streaming image and video data, problems can result. The most notable problems concern latency.

To continue the example, a windows NT terminal server can be used to display a Powerpoint presentation at a RDP client. When there is no cross-traffic on the network, it takes approximately 200 milliseconds (ms) to transport data corresponding to a slide. The same slide of data may require 1100 ms to transport when there is competing cross-traffic (which started at a particular time). That is, the latency increases from 200 to 1100 ms. Similarly, video frame dropping may occur when video is "played back" using TCP network. The frame dropping occurs due to missed playout deadlines.

Modifications have been suggested with respect to TCP, with motivation of providing network fairness, while at the same time, increasing throughput. These efforts have resulted in the various congestion avoidance and slow start schemes. In addition, suggestions have been made to modify round trip times, or to include additional fields in the TCP packets. Several of these modifications are aimed at a good performance on the general Internet and on network paths that span multiple routers and one or more bottleneck links. However, none of these proposed solutions is particularly addressed to improving latency in a LAN network.

It would be advantageous if the TCP in a LAN could be modified to improve the latency of at least a small class of higher priority applications.

SUMMARY OF THE INVENTION

The present invention is designed for use in controlled environment, such as an office LAN network, by trusted applications, that will be referred to herein as TCP streaming applications. These TCP streaming applications are run, perhaps, under restricted access. The present invention TCP modifications permit these TCP streaming applications to transmit data with a low latency and high throughput in the face of cross-traffic. More specifically, the modifications deal with slow restart and congestion avoidance parts of TCP. These modifications may result in the TCP streaming application receiving a larger, "unfair" share of the bandwidth. As a result, these modifications are more suitable for LAN environments, where the server to client route does not span multiple routers and bottleneck links.

Accordingly, a method is provided for sending TCP messages in a LAN. The method comprises: selecting a TCP streaming application; transmitting message segments at a rate responsive to a congestion window parameter; and, maintaining at least the congestion window parameter during the session, regardless of idle time between transmitted segments.

In some aspects, the method further comprises: selecting a threshold level. Then, incrementing the congestion window parameter with an increment in response to receiving acknowledgements includes increasing the congestion window parameter until the congestion window parameter equals the threshold level. Additionally, the method further comprises: in response to not receiving an acknowledgment, maintaining the threshold level; and, in response to not receiving an acknowledgement, maintaining the congestion window parameter.

Additional details of the above-described method, and a system for sending TCP messages in a LAN are provided below.

DETAILED DESCRIPTION OF THE PREFERRED EMBODIMENTS

Figure 1:
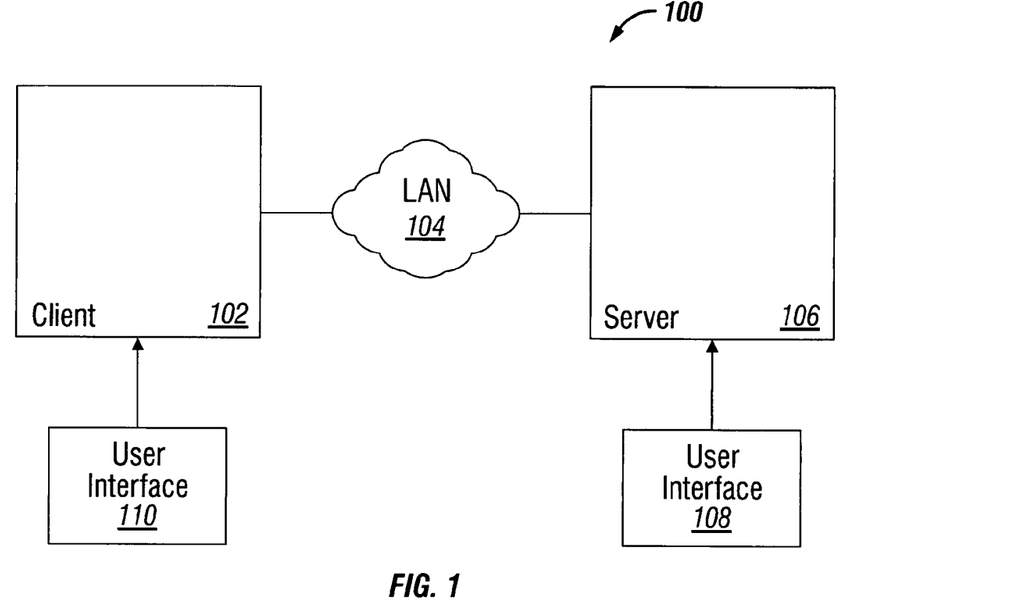
FIG. 1 is a schematic block diagram illustrating the present invention system for sending TCP messages in a LAN.

FIG. 1 is a schematic block diagram illustrating the present invention system for sending TCP messages in a LAN. The system 100 comprises a client 102 having a port connected to a LAN 104 for receiving message segments and transmitting acknowledgements in response to receiving the segments. A server 106 has a user interface 108 to accept the selection of a TCP streaming application. In some aspects of the system 100, the user interface 108 can be used for selecting a remote desktop protocol (RDP) application running on top of the selected TCP. The server 106 has a port connected to the LAN 104 for transmitting message segments at a rate that is responsive to a congestion window parameter. However, unlike conventional TCP protocol, the server transmission rate is non-responsive to idle time between transmitting segments.

As mentioned above, a slow start (or restart) mechanism is conventionally employed at the start of a message transmission session or after an idle time in the session. Thus, even if the server 106 was successfully transmitting at a data rate of 10X, for example, before the idle time, the server will begin with a starting transmission rate of X, for example, after the idle time. As acknowledgements are received, the conventional TCP server slowly increases the data rate. The present invention, maintains the previous data rate for TCP streaming applications, even after an idle time between transmissions.

Conventionally, a server receives acknowledgements for segments successfully received by a client and increases the congestion window parameter with an increment in response to receiving acknowledgements. It is also conventional that the server selects a threshold level. The conventional TCP server increases the congestion window parameter in response to receiving acknowledgements, until the congestion window parameter equals the threshold level. The conventional TCP server decreases the threshold level in response to not receiving acknowledgments. Further, a server using conventional TCP decreases the congestion window parameter in response to not receiving acknowledgments.

In some aspects of the system 100, however, the server 106 selects a threshold level, increases the congestion window parameter in response to receiving acknowledgements, until the congestion window parameter equals the threshold level. Unlike conventional TCP, the server 106 maintains the threshold level in response to not receiving acknowledgments. Likewise, the server 106 may maintain the threshold level in response to receiving duplicate acknowledgements.

In some aspects, the server 106 may decrease the congestion window parameter in response to not receiving acknowledgments, as is conventional. In other aspects, however, the server 106 maintains the congestion window parameter in response to not receiving acknowledgements. Likewise, the server 106 may maintain the congestion window parameter in response to receiving duplicate acknowledgements. The maintenance of the threshold level and congestion window parameter also help increase the transmission rate of data sent using the TCP streaming application.

In some aspects of the system 100, the client 102 has a user interface 110 to accept the selection of a TCP streaming application. Then, the client can transmit message segments at a rate that is responsive to a congestion window parameter. Like the server 106, the client 102 transmission rate is non-responsive to idle time between transmitting segments. Then, the server 106 transmits acknowledgements in response to receiving the segments from the client 102. The selection of a TCP streaming application at both the client and server permits an enhanced data rate along both transmission paths, to the client and to the server.

In the same manner as the server 106 described above, the client 102 may select a threshold level. The client 102 increases the congestion window parameter in response to receiving acknowledgements, until the congestion window parameter equals the threshold level. The client may also maintain the threshold level in response to not receiving acknowledgments. Likewise, the client 102 may also maintain the congestion window parameter in response to not receiving acknowledgements.

In other aspects of the system 100, the server 106 (or client) uses just the present invention TCP modification of maintaining the threshold level in response to not receiving acknowledgements. That is, the elements of maintaining the data rate despite idle times and the maintaining of the congestion window parameter in response to not receiving acknowledgements are not adopted.

In another aspect of the system 100, the server 106 (or client) maintains the congestion window parameter and the threshold level in response to not receiving acknowledgements. Again, in this aspect, the server congestion window parameter is non-responsive to the idle time between transmitting segments.

Alternately, the server 106 (or client) may maintain the threshold level in response to not receiving acknowledgements, and the server congestion window parameter may be non-responsive to the idle time between transmitting segments. In this aspect, the server does not maintain the congestion window parameter in response to not receiving acknowledgements.

As another alternative, the server 106 (and client) just maintains the congestion window parameter in response to not receiving acknowledgements. That is, the server decreases the threshold level in response to not receiving acknowledgments and in response to idle time between transmitting segments, as is done with conventional TCP.

In another variation, the server 106 (and client) maintains the congestion window parameter in response to not receiving acknowledgements, and the server congestion window parameter is non-responsive to the idle time between transmitting segments. In this variation, the server decreases the threshold level in response to not receiving acknowledgements, as is conventional.

It should be noted that when the client and server both select a TCP streaming application, the two TCP streaming applications may incorporate different aspects of the above-mentioned present invention modifications.

Functional Description

TCP/IP is a reliable protocol for data transfer. A major component of TCP is its congestion control algorithm, which was introduced in 1988. Detailed theoretical analysis of TCP congestion control has been performed by several researchers. Several modifications have been made to TCP congestion control, resulting in TCP Tahoe, Reno and Vegas variants.

One exemplary scenario illustrating the TCP latency issue is an enterprise network projector, where the presenter "flips" a slide and then takes time to explain it before flipping the next slide. In this scenario, the data is transmitted by a server to a projector client. There can be idle periods when no data needs to be delivered in the session.

Figure 2:
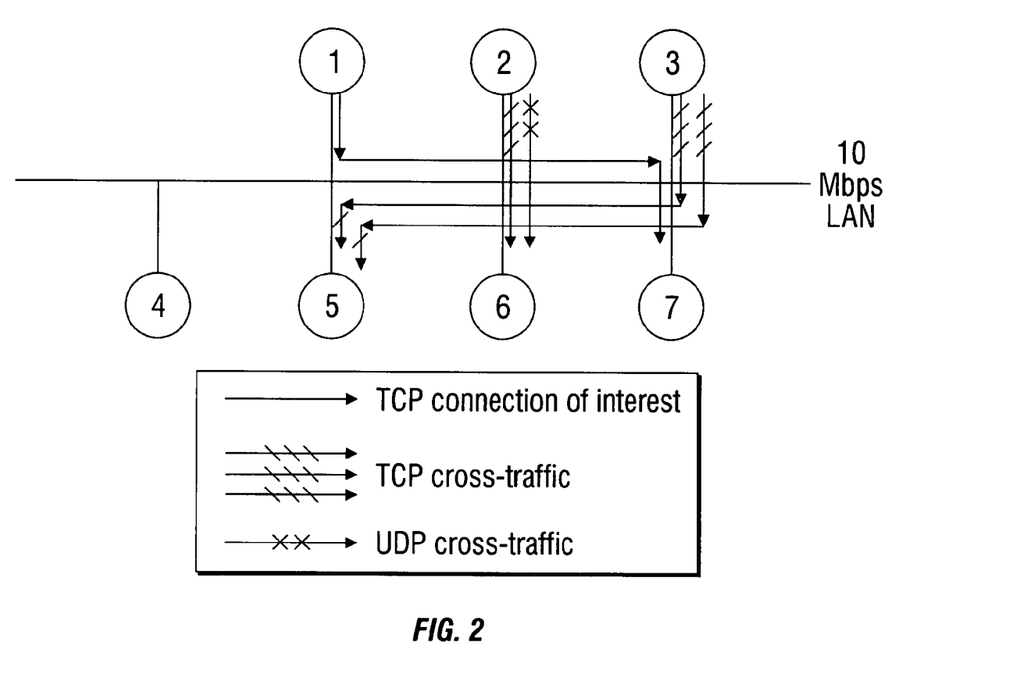
FIG. 2 is an exemplary LAN network with the session of interest between node 1 (server) and 7 (client).

FIG. 2 is an exemplary LAN network with the session of interest between node 1 (server) and 7 (client). Node 1 packetizes and sends 15 Kbytes of data at {0,1,2,3,4} seconds to the node 7. This could correspond to slide flippings at these intervals. In one scenario, the delay is very small for the data transmitted at 0,1,2 and 4 seconds. However competing cross-traffic results in severe latency for the data transmitted at 3 seconds. This is because a competing cross-traffic (FTP) was started at time 2.1 seconds. The latency increases with the number of competing tcp, udp flows in the LAN.

The slow restart feature of conventional TCP results in the resetting of the congestion window during the idle time between slide flippings. By disabling the TCP slow restart, the congestion window retains its previous value and the competing traffic, which was started during the idle time, is not able to impact the latency of the session between nodes 1 and 7.

In other scenarios, increased latency is a result of the congestion control algorithm of TCP, as opposed to the slow restart. Node 1 packetizes and sends 15 Kbytes of data at {0,0.25,0.5, . . . , 1.5,1.75} second intervals to node 7. Because of the small idle times, slow restart is not an issue. However, the cross-traffic can still increase the latency because of the congestion control algorithm of the TCP.

Part of a conventional TCP congestion control algorithm is shown below:

Whenever the sender receives an ACK for a sent data:

```
1. if(CongestionWnd < ssthresh)
{
    Congestionwnd=Congestionwnd+1;
}
2. else
{
    CongestionWnd=CongestionWnd+(1/Congestionwnd);
}
3. On a timeout:
ssthresh= CongestionWnd/2;
Congestionwnd=1;
``` where CongestionWnd is the congestion window and ssthresh is a threshold value. This algorithm is referred to as TCP Tahoe. Several modifications of TCP Tahoe have been proposed. One of the commonly implemented versions of TCP is TCP Reno. Various modern operating systems (including MS Windows) TCP/IP stacks also use TCP Reno. A typical implementation of TCP Reno congestion control algorithm as used in NS 2.1 (a network simulator as shown below:

```
Void TcpAgent::slowdown(int how)
{
int halfwin = int (window( ) / 2);
int decreasewin = int (decrease_num_ * window( ));
if (how & CLOSE_SSTHRESH_HALF)
{
    ssthresh = decreasewin;
}
if (how & CLOSE_CWND_HALF)
{
    // For the first decrease, decrease by half
    // even for non-standard values of decrease_num_.
    if (first_decrease_ == 1 || decrease_num_ == 0.5)
    {
        CongestionWnd = halfwin;
        first_decrease_ = 0;
    }
    else
    {
        CongestionWnd = decreasewin;
    }
```

```
}
//Other cases
}
``` where TCP Reno calls the function above with following parameters:

slowdown(CLOSE_SSTHRESH_HALF I CLOSE_CWND_HALF);

In the above pseudo-codes, CongestionWnd is the congestion window and ssthresh is a threshold value. One aspect of the present invention modifies the congestion control as follows:

```
Void TcpAgent::slowdown(int how)
{
    if (how & CLOSE_CWND_HALF)
    {
        CongestionWnd = int(window( )/2);
        if (CongestionWnd < 1)
        {
            CongestionWnd = 1;
        }
        return;
    }
    else
    {
        return;
    }
}
```

Thus, the present invention modification decreases the Congestionwindow but make no change to ssthresh. This results in a more aggressive increase to the Congestionwindow, until it reaches the same old threshold value again. Another more aggressive modification is to disable the congestion avoidance part and take no action on a timeout or duplicate ACK. This is equivalent to disabling part 3 in the TCP Tahoe pseudo-code shown above.

Figure 3:
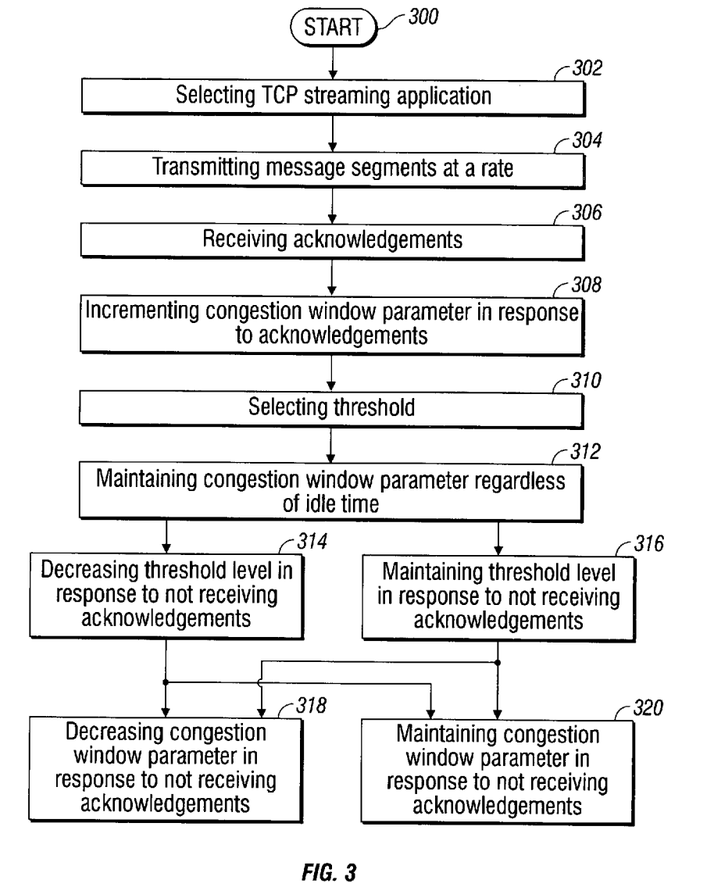
FIG. 3 is a flowchart illustrating the present invention method for sending TCP messages in a LAN.

FIG. 3 is a flowchart illustrating the present invention method for sending TCP messages in a LAN. Although the method, as well as the methods of FIGS. 4 and 5 below, is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300.

Step 302 selects a TCP streaming application. In some aspects of the method, selecting a TCP streaming application includes selecting a remote desktop protocol (RDP) application for use on top of the TCP. Step 304 transmits message segments at a rate responsive to a congestion window parameter. Step 306 receives acknowledgements for received segments. Step 308 increases the congestion window parameter with an increment in response to receiving acknowledgements. Step 310 selects a threshold level. Then, incrementing the congestion window parameter with an increment in response to receiving acknowledgements in Step 308 includes increasing the congestion window parameter until the congestion window parameter equals the threshold level. Step 312 maintains at least the congestion window parameter during the session, regardless of idle time between transmitted segments. Alternately stated, Step 312 maintains the transmission rate, regardless of idle time between transmitted segments.

Some aspects of the method include further steps. Step 314 decreases the threshold level in response to not receiving an acknowledgment. Alternately, Step 316 maintains the threshold level in response to not receiving an acknowledgment. In some aspects, maintaining the threshold level in response to not receiving an acknowledgment in Step 316 includes maintaining the threshold level in response to receiving duplicate acknowledgements.

In other aspects, Step 318 decreases the congestion window parameter in response to not receiving an acknowledgment. Alternately, Step 320 maintains the congestion window parameter in response to not receiving an acknowledgment. In some aspects, maintaining the congestion window parameter in response to not receiving an acknowledgment in Step 320 includes maintaining the congestion window parameter in response to receiving duplicate acknowledgements.

Figure 4:
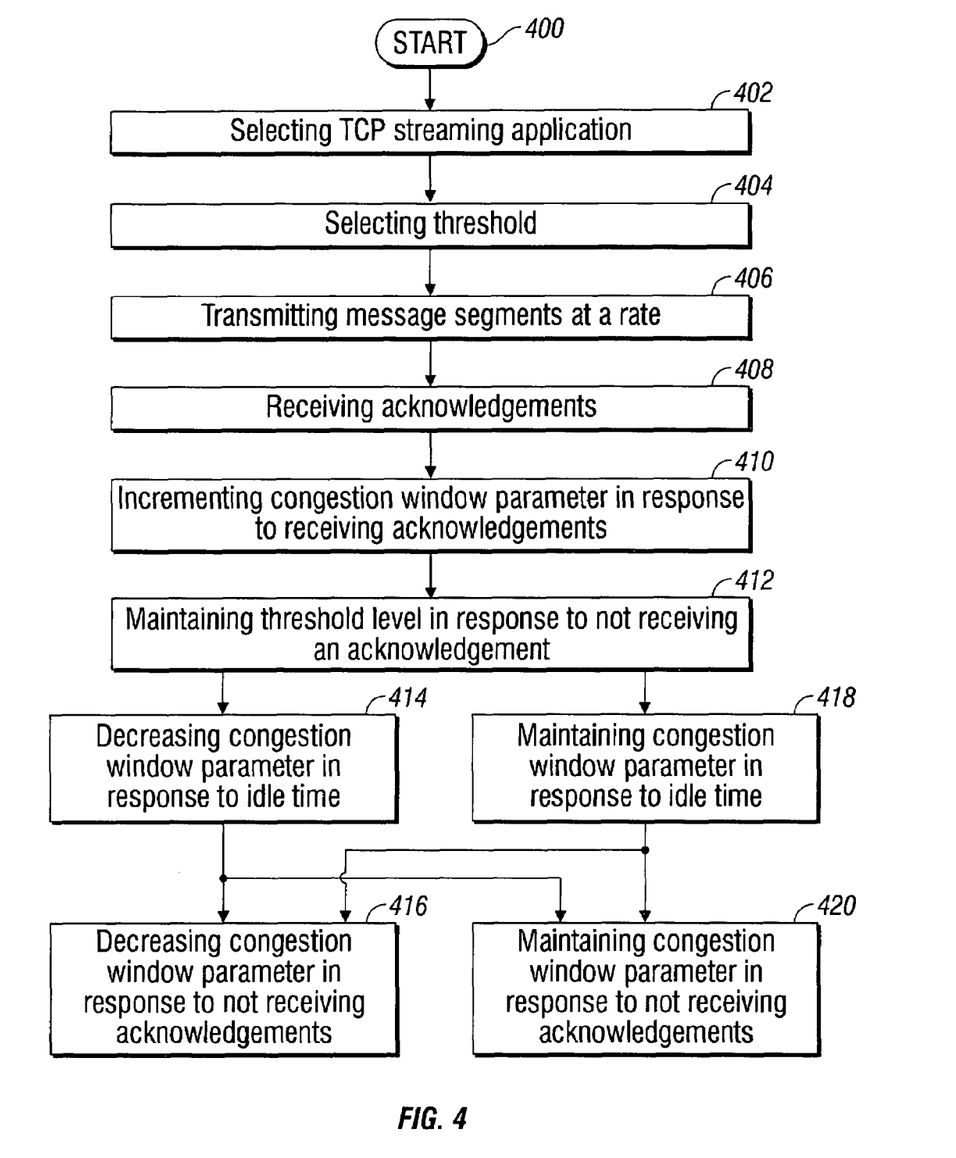
FIG. 4 is a flowchart illustrating a variation in the present invention method for sending TCP messages in a LAN.

FIG. 4 is a flowchart illustrating a variation in the present invention method for sending TCP messages in a LAN. The method starts at Step 400. Step 402 selects a TCP streaming application. Step 404 selects a threshold level. Step 406 transmits message segments at a rate responsive to a congestion window parameter. Step 408 receives acknowledgements for received segments. Step 410 increments the congestion window parameter with an increment in response to receiving acknowledgements until the congestion window parameter equals the threshold level. Step 412 maintains the threshold level in response to not receiving an acknowledgment.

In some aspects a further step, Step 414, decreases the congestion window parameter in response to idle time between transmitted segments, following the transmitting of message segments at a rate responsive to the congestion window parameter (Step 406). Likewise, Step 416, in response to not receiving an acknowledgement, decreases the congestion window parameter.

As an alternative, Step 418 maintains at least the congestion window parameter during the session, regardless of idle time between transmitted segments, following the transmitting of message segments at a rate responsive to the congestion window parameter. Step 420 maintains the congestion window parameter in response to not receiving an acknowledgement.

Figure 5:
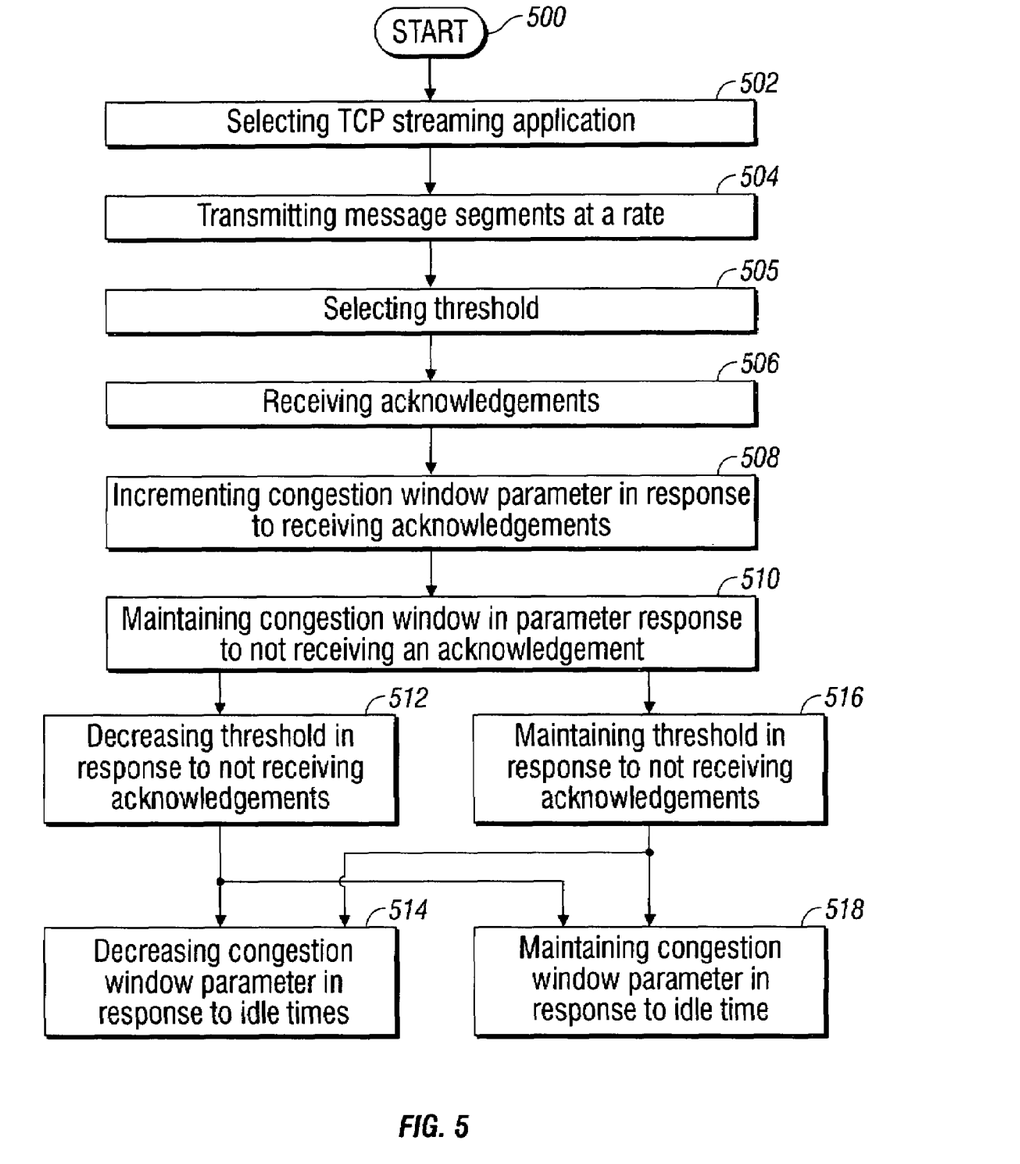
FIG. 5 is yet another variation of the present invention method for sending TCP messages in a LAN.

FIG. 5 is yet another variation of the present invention method for sending TCP messages in a LAN. The method starts at Step 500. Step 502 selects a TCP streaming application. Step 504 transmits message segments at a rate responsive to a congestion window parameter. Step 506 receives acknowledgements for received segments. Step 508 increments the congestion window parameter with an increment in response to receiving acknowledgements. Step 510, in response to not receiving an acknowledgment, maintains the congestion window parameter level.

Some aspects of the method include further steps. Step 505 selects a threshold level. Then, incrementing the congestion window parameter with an increment in response to receiving acknowledgements in Step 508 includes increasing the congestion window parameter until the congestion window parameter equals the threshold level.

In some aspects, Step 512 decreases the threshold level in response to not receiving an acknowledgment. Step 514, following the transmitting of message segments at a rate responsive congestion window parameter, decreases the congestion window parameter in response to idle time between transmitted segments.

Alternately, Step 516 maintains the threshold level in response to not receiving an acknowledgment. In another alternate step following the transmitting of message segments at a rate responsive to a congestion window parameter, Step 518 maintains at least the congestion window parameter during the session, regardless of idle time between transmitted segments.

A system and method have been provided that demonstrate TCP messaging using a TCP streaming application. A few examples have been given to illustrate some aspects and uses for the invention. However, the invention is not limited to merely these examples. Other variations and embodiments of the present invention will occur to those skilled in the art.

I claim:

1. In a local area network (LAN), a method for sending messages in a variation of a transmission control protocol (TCP), the method comprising:
   transmitting a first group of message segments in a session;
   in response to receiving acknowledgements to the first group of message segments, establishing a first congestion window parameter; and,
   in response to an idle time between the first group and a second group of transmitted message segments, when no data needs to be transmitted, maintaining the first congestion window parameter during the session, instead of decreasing the congestion window parameter to a slow-start value.

2. The method of claim 1 further comprising:
   receiving acknowledgements for the second group of transmitted message segments; and,
   increasing the first congestion window parameter with an increment in response to successfully receiving acknowledgements for the second group.

3. The method of claim 2 further comprising:
   selecting a threshold level;
   wherein increasing the first congestion window parameter with an increment in response to the successfully receiving acknowledgements for the second group of transmitted message segments includes increasing the first congestion window parameter until the first congestion window parameter equals the threshold level; and,
   the method further comprising:
   in response to not receiving an acknowledgment for a second group transmitted message segment, decreasing the threshold level.

4. The method of claim 3 further comprising:
   in response to not receiving an acknowledgment for a second group transmitted message segment, decreasing the first congestion window parameter.

5. The method of claim 2 further comprising:
   selecting a threshold level;
   wherein increasing the first congestion window parameter with an increment in response to the successfully received acknowledgements for the second group transmitted message segments includes increasing the first congestion window parameter until the first congestion window parameter equals the threshold level; and,
   the method further comprising:
   in response to not receiving an acknowledgment for a second group transmitted message segment, maintaining the threshold level.

6. The method of claim 5 further comprising:
   in response to not receiving an acknowledgment for a second group transmitted message segment, decreasing the first congestion window parameter.

7. The method of claim 5 further comprising:
   in response to not receiving an acknowledgement for a second group transmitted message segment, maintaining the first congestion window parameter.

8. The method of claim 2 further comprising:
   in response to not receiving an acknowledgement for a second group transmitted message segment, maintaining the first congestion window parameter.

9. The method of claim 8 wherein maintaining the first congestion window parameter in response to not receiving an acknowledgment for a second group transmitted message segment includes maintaining the first congestion window parameter in response to receiving duplicate acknowledgements for a second group transmitted message segment.

10. The method of claim 5 wherein maintaining the threshold level in response to not receiving an acknowledgment for a second group transmitted message segment includes maintaining the threshold level in response to receiving duplicate acknowledgements for a second group transmitted message segment.

11. The method of claim 1 further comprising:
    selecting a remote desktop protocol (RDP) application for use on top of a TCP application; and,
    wherein transmitting the first group of message segments includes transmitting the message segments in response to selecting the RDP application.

12. In a local area network (LAN), a method for sending message in a variation of a transmission control protocol (TCP), the method comprising:
    selecting a threshold level;
    transmitting a first group of message segments in a session;
    receiving acknowledgements for the first group of transmitted message segments;
    in response to the acknowledgements, establishing a congestion window parameter;
    increasing the congestion window parameter with an increment in response to successfully receiving acknowledgements for a second group of transmitted message segments until the congestion window parameter equals the threshold level;
    in response to not receiving an acknowledgment for a second group transmitted message segment, maintaining the threshold level; and,
    maintaining the congestion window parameter during the session in response to an idle time between the first and second groups of transmitted message segments, when no data needs to be transmitted, instead of decreasing the congestion window parameter to a slow-start value.

13. The method of claim 12 further comprising:
    in response to not receiving an acknowledgement for a second group transmitted message segment, maintaining the congestion window parameter.

14. In a local area network (LAN), a method for sending messages in a variation of a transmission control protocol (TCP), the method comprising:
    transmitting a first group of message segments in a session;
    in response to receiving acknowledgements for the first group of transmitted message segments at, establishing a first congestion window parameter;
    receiving acknowledgements for a second group of transmitted message segments;
    increasing the first congestion window parameter with an increment in response to successfully receiving acknowledgements for the second group of transmitted message segment; and,
    in response to not receiving an acknowledgment for a second group transmitted message segment, maintaining the first congestion window parameter level.

15. The method of claim 14 further comprising:
selecting a threshold level;
wherein increasing the first congestion window parameter with an increment in response to successfully acknowledgements includes increasing the congestion window parameter until the first congestion window parameter equals the threshold level; and,
the method further comprising:
in response to not receiving an acknowledgment for a second group transmitted message segment, decreasing the threshold level; and,
decreasing the first congestion window parameter in response to an idle time between the first and second groups of transmitted message segments when no data needs to be transmitted.

16. The method of claim 14 further comprising:
selecting a threshold level;
wherein increasing the first congestion window parameter with an increment in response to successfully receiving acknowledgements includes increasing the congestion window parameter until the first congestion window parameter equals the threshold level; and,
the method further comprising:
in response to not receiving an acknowledgment for a second group transmitted message segment, maintaining the threshold level.

17. The method of claim 16 further comprising:
maintaining the first congestion window parameter during the session, in response to an idle time between the first and second groups of transmitted message segments when no data needs to be transmitted.

18. The method of claim 14 further comprising:
maintaining the first congestion window parameter during the session, in response to an idle time between the first and second group of transmitted message segments when no data needs to be transmitted.

19. In a local area network (LAN), a system for sending messages in a variation of a transmission control protocol (TCP), the system comprising:
a client having a port connected to a LAN for receiving message segments and transmitting acknowledgements in response to receiving the segments; and,
a server having a port connected to the LAN for transmitting message segments, the server transmitting a first group of message segments in a session, establishing a first congestion window parameter that is responsive to receiving acknowledgements for the first group transmitted message segments, and maintaining the first congestion window parameter in the session in response to an idle time between the first group and a subsequently transmitted second group of message segments when, no data needs to be transmitted, instead of decreasing the congestion window parameter to a slow-start value.

20. The system of claim 19 wherein the server successfully receives acknowledgements for the second group of transmitted message segments and increases the first congestion window parameter with an increment.

21. The system of claim 20 wherein the server selects a threshold level, increases the first congestion window parameter in response to successfully receiving acknowledgements for the second group transmitted message segments, until the first congestion window parameter equals the threshold level, and decreases the threshold level in response to not receiving an acknowledgment for a second group transmitted message segment.

22. The system of claim 21 wherein the server decreases the first congestion window parameter in response to not receiving an acknowledgment for a second group transmitted message segment.

23. The system of claim 20 wherein the server selects a threshold level, increases the first congestion window parameter in response to successfully receiving acknowledgements for the second group transmitted message segments, until the first congestion window parameter equals the threshold level, and maintains the threshold level in response to not receiving an acknowledgment for a second group transmitted message segment.

24. The system of claim 23 wherein the server decreases the first congestion window parameter in response to not receiving an acknowledgment for a second group transmitted message segment.

25. The system of claim 23 wherein the server maintains the first congestion window parameter in response to not receiving an acknowledgement for a second group transmitted message segment.

26. The system of claim 20 wherein the server maintains the first congestion window parameter in response to not receiving an acknowledgement for a second group transmitted message segment.

27. The system of claim 26 wherein the server maintains the first congestion window parameter in response to receiving duplicate acknowledgements for a second group transmitted message segment.

28. The system of claim 23 wherein the server maintains the threshold level in response to receiving duplicate acknowledgements for a second group transmitted message segment.

29. The system of claim 19 wherein the server has a user interface for selecting a remote desktop protocol (RDP) application running on top of a TCP application, and transmits the first group of message segments in response to the RDP.

30. The system of claim 19 wherein the client has a user interface to accept the selection of a TCP streaming application; and,
wherein the server transmits acknowledgements in response to receiving the message segments from the client.

31. The system of claim 30 wherein the client selects a threshold level, increases the first congestion window parameter in response to successfully receiving acknowledgements for the second group transmitted message segments, until the first congestion window parameter equals the threshold level, and maintains the threshold level in response to not receiving an acknowledgment for a second group transmitted message segment.

32. The system of claim 31 wherein the client maintains the first congestion window parameter in response to not receiving an acknowledgement for a second group transmitted message segment.

33. In a local area network (LAN), a system for sending messages in a variation of a transmission control protocol (TCP), the system comprising:
a client having a port connected to a LAN for receiving message segments and transmitting acknowledgements in response to receiving the segments; and,
a server having a port connected to the LAN for transmitting a first group of message segments in a session, establishing a first congestion window parameter responsive to receiving acknowledgements for the first group of transmitted message segments, increasing the first congestion window parameter with an increment in response to successfully receiving acknowledgements for a second group of transmitted message segments, until the first congestion window parameter equals a selected threshold level, and maintaining the threshold level in response to not receiving an acknowledgement for a second group transmitted message segment; and, wherein the server maintains the first congestion window parameter during the session in response to an idle time between the first and second group of transmitted message segments, when no data needs to be transmitted, instead of decreasing the congestion window parameter to a slow-start value.

34. The system of claim 33 wherein the server maintains the first congestion window parameter in response to not receiving an acknowledgement for a second group transmitted message segment.

35. In a local area network (LAN), a system for sending messages in a variation of a transmission control protocol (TCP), the system comprising:

a client having a port connected to a LAN for receiving message segments and transmitting acknowledgements in response to receiving the message segments; and, a server having a port connected to the LAN for transmitting a first group of message segments in a session, establishing a first congestion window parameter responsive to receiving acknowledgements for the first group of transmitted message segments, increasing the first congestion window parameter with an increment in response to successfully receiving acknowledgements for a second group of transmitted message segments, and maintaining the first congestion window parameter in response to not receiving an acknowledgement for a second group transmitted message segment.

36. The system of claim 35 wherein the server increases the first congestion window parameter with an increment, in response to successfully receiving acknowledgements for the second group of transmitted message segments, until the first congestion window parameter equals the threshold level, the server decreasing the threshold level in response to a condition selected from a group consisting of not receiving acknowledgments for a second group transmitted message segment and an idle time between the first and second group of transmitting message segments, when no data needs to be sent.

37. The system of claim 35 wherein the server increases first the congestion window parameter with an increment in response to successfully receiving acknowledgements for the second group of transmitted message segments, until the first congestion window parameter equals the threshold level, and maintains the threshold level in response to not receiving an acknowledgment for a second group transmitted message segment.

38. The system of claim 37 wherein the server maintains the first congestion window parameter in response to an idle time between the first and second group of transmitted message segments when no data needs to be transmitted.

39. The system of claim 35 wherein the server maintains the first congestion window parameter in response to an idle time between the first and second group of transmitted message segments when no data needs to be transmitted.

* * * * *